US008020663B2

(12) United States Patent
Sengissen et al.

(10) Patent No.: US 8,020,663 B2
(45) Date of Patent: Sep. 20, 2011

(54) METHOD FOR REDUCING THE NOISE GENERATED BY A HOLE UNDER A HIGH ENERGY GAS FLOW

(75) Inventors: Alois Sengissen, L'Isle Jourdain (FR); Bastien Caruelle, Toulouse (FR); Jean-François Piet, Pibrac (FR); Stéphane Perrin Decroux, Poucharramet (FR); Nicolas Molin, Nailloux (FR); Pascal Souchotte, Lyons (FR); Emmanuel Jondeau, Lentilly (FR); Jean-Michel Perrin, Villeurbanne (FR); Constantin Sandu, Bucharest (RO)

(73) Assignee: Airbus Operations SAS (FR)

( * ) Notice: Subject to any disclaimer, the term of this patent is extended or adjusted under 35 U.S.C. 154(b) by 0 days.

(21) Appl. No.: 12/617,490

(22) Filed: Nov. 12, 2009

(65) Prior Publication Data

US 2010/0122869 A1 May 20, 2010

(30) Foreign Application Priority Data

Nov. 14, 2008 (FR) ..................................... 08 06365

(51) Int. Cl.
*E04F 17/04* (2006.01)
*F01N 1/10* (2006.01)
*F01N 1/24* (2006.01)
*F16N 27/00* (2006.01)
*F16L 55/027* (2006.01)
*G01F 1/42* (2006.01)

(52) U.S. Cl. ........ 181/224; 181/252; 181/256; 181/258; 138/41; 138/42; 138/44

(58) Field of Classification Search ................. 181/224, 181/252, 256, 258; 244/1 N; 138/41, 42, 138/44
See application file for complete search history.

(56) References Cited

U.S. PATENT DOCUMENTS

| 2,225,990 | A | * | 12/1940 | Henry | .............................. | 96/118 |
| 2,508,224 | A | * | 5/1950 | Carter | .............................. | 138/42 |
| 2,966,838 | A | * | 1/1961 | Thompson et al. | ............... | 454/8 |
| 3,300,951 | A | * | 1/1967 | Sorg et al. | ........................ | 55/355 |
| 3,449,891 | A | * | 6/1969 | Amelio et al. | ................... | 55/306 |
| 3,495,950 | A | * | 2/1970 | Frost et al. | ..................... | 422/171 |
| 3,617,416 | A | * | 11/1971 | Kromrey | ....................... | 156/173 |
| 3,642,031 | A | * | 2/1972 | Wright | ............................ | 138/45 |
| 3,724,502 | A | * | 4/1973 | Hayner et al. | ................... | 138/41 |

(Continued)

FOREIGN PATENT DOCUMENTS

WO   WO 2008/135647   11/2008

OTHER PUBLICATIONS

Franke, et al., "Effect of Geometry on the Open Cavity Flow-Induced Pressure Oscillations", Progress in Astronautics and Aeronautics, Academic Press, vol. 45, Jan. 1976.

(Continued)

*Primary Examiner* — Elvin G Enad
*Assistant Examiner* — Christina Russell
(74) *Attorney, Agent, or Firm* — Gregory A. Nelson; Eduardo J. Quinones; Novak Druce & Quigg LLP

(57) ABSTRACT

According to the invention, at least part of the edge of the hole is loosely surrounded with a mesh structure so as to create a space between the latter and said edge part.

7 Claims, 2 Drawing Sheets

U.S. PATENT DOCUMENTS

| | | | |
|---|---|---|---|
| 3,884,037 A * | 5/1975 | Barber et al. | 60/292 |
| 3,960,239 A * | 6/1976 | Frochaux et al. | 181/258 |
| 4,035,303 A * | 7/1977 | Ufferfilge | 210/316 |
| 4,361,423 A * | 11/1982 | Nitz | 96/1 |
| 4,530,417 A * | 7/1985 | Daniel | 181/223 |
| 5,013,029 A * | 5/1991 | Vaux | 404/32 |
| 5,166,479 A * | 11/1992 | Gras et al. | 181/256 |
| 5,699,981 A | 12/1997 | McGrath et al. | |
| 6,000,433 A * | 12/1999 | Carroll et al. | 138/41 |
| 7,185,678 B1 * | 3/2007 | Stell et al. | 138/41 |
| 2005/0092181 A1 * | 5/2005 | Shih et al. | 95/283 |
| 2006/0102775 A1 * | 5/2006 | Chow et al. | 244/1 N |
| 2009/0078498 A1 * | 3/2009 | Woods | 181/252 |
| 2009/0078821 A1 * | 3/2009 | Chow et al. | 244/1 N |
| 2010/0108805 A1 * | 5/2010 | Piet et al. | 244/1 N |

OTHER PUBLICATIONS

Sarno, et al., "Suppression of Flow-Induced Pressure Oscillations in Cavities," AIAA Aeroacoustics Conference, XP000905018, Oct. 10, 1990.

Baysal, et al., "Navier-Stokes Computations of Cavity Aeroacoustics with Suppression Devices," Journal of Vibration and Acoustics, American Soc. of Mech. Engineers, Jan. 1994.

Lamp, et al., "Computation of Cavity Flows with Suppression Using Jet Blowing," Journal of Aircraft, AIAA, vol. 34, No. 4, pp. 545-551, Jul. 1, 1997.

Seiichiro, et al., "Sound Suppression of Laminar Separating Flow over Cavity," JSME International Journal, vol. 49, No. 4, pp. 1092-1107, 2006.

* cited by examiner

METHOD FOR REDUCING THE NOISE GENERATED BY A HOLE UNDER A HIGH ENERGY GAS FLOW

CROSS-REFERENCE TO RELATED APPLICATIONS

This application claims priority to French Patent Application 0806365, filed Nov. 14, 2008, the entire contents of which are incorporated herein by reference.

FIELD OF THE INVENTION

The present invention relates to a method for reducing the noise generated by an orifice placed in an energetic gas flow. It applies quite especially, although not exclusively, to the aeronautical field, particularly to orifices of air conditioning system ducts and to orifices of blind cavities created in the surface of an aircraft.

BACKGROUND OF THE INVENTION

It is known that when an orifice is placed in an energetic gas flow, such as an air stream, its edge gives rise to phenomena of turbulence which constitute sources of noise, the intensity of which varies with the flow conditions (the speed of the flow, the external temperature, the temperature of the gas, the angle of incidence of the flow with respect to the orifice, etc).

It is an object of the present invention to remedy this disadvantage by attenuating the noise produced by such an orifice positioned in a gas flow.

SUMMARY OF THE INVENTION

To this end, according to the invention, the method for reducing the noise generated by an orifice placed in an energetic gas flow is notable in that at least part of the edge of said orifice is loosely surrounded with a mesh structure so as to create a space between the latter and said edge part, said mesh structure being able, on the one hand, to divide said energetic gas flow into a plurality of less energetic secondary gas flows passing through said space to reach said edge part, and, on the other hand, to break up the sound waves possibly generated by said edge part under the action of said less energetic secondary gas flows.

Having the incident energetic gas flow pass through the mesh structure allows some of the energy of this flow to be dissipated, converting it into a multitude of less energetic secondary gas flows. The latter, as they impinge on the part of the edge of the orifice that is surrounded by the mesh structure, possibly generate omnidirectional sound waves the frequency of which is higher (for example a few kHz) and the intensity of which is lower than those that would have been generated by the impingement of the incident energetic gas flow on said edge part without the mesh structure. Furthermore, these omnidirectional sound waves generated in said space created between said edge part of the orifice and the mesh structure are broken up by the meshes of the latter as they pass through it toward the outside, so that they lose most of their energy, said orifice then practically no longer generating any noise outside of said mesh structure.

Thus, according to the invention, the combination of said mesh structure surrounding said edge part of the orifice and of said space produces a twofold noise-attenuating effect, firstly by splitting up the incident energetic gas flow and secondly by destroying any sound waves that may be generated inside said space.

It will be noted that document FR 0702128 implements a mesh structure of the net type to attenuate the aerodynamic noise produced by an airplane landing gear when it is positioned in an energetic air flow. This mesh structure is arranged downstream of said landing gear, orthogonal to said flow. As a result, in this document FR 0702128, the mesh structure is able only to break up sound waves generated by the landing gear, without having previously split this energetic air flow into a multitude of less energetic secondary air flows. The technique employed in document FR 0702128 does not therefore make it possible both to split up the energetic flow into a plurality of less energetic secondary flows and to destroy the lower-intensity sound waves generated under the action of said secondary flows.

In general, particularly when the angle of incidence of said gas flow is small with respect to the axis of said orifice, it is advantageous for said mesh structure to be positioned around the entire edge of said orifice.

However, when the angle of incidence of said gas flow is at a grazing angle with respect to said orifice, it may suffice for said mesh structure to be arranged only around the downstream part and/or upstream part of the edge of said orifice. Indeed it has been found that the downstream part of the edge of an orifice, positioned in an energetic gas flow at a grazing angle of incidence, was the cause of noise sources. Further, by positioning the mesh structure around the upstream part of the edge of said orifice, the energetic flow arriving at the downstream part of this orifice is slowed, thus reducing the intensity of the noise produced by the orifice.

In one particular embodiment of the invention, at least part of the edge of said orifice may be chamfered so that said mesh structure can be fixed to the chamfer obtained in order to form said space between this mesh structure and said chamfer.

Furthermore, the meshes of said structure, which for example consist of filaments criss-crossing one another, may have a circular or polygonal shape. Some of said filaments that make up the meshes may be orthogonal to said edge part of said orifice, whereas others may be parallel thereto.

Furthermore, the mesh structure of the invention is preferably made of a metallic material (such as steel, aluminum, etc.) which allows it to withstand the effects of the flow and retain its initial shape. It may also be made out of a rigid or elastic plastic (polyester fiber for example).

BRIEF DESCRIPTION OF THE DRAWINGS

The figures of the attached drawing will make it easy to understand how the invention may be embodied. In these figures, references that are identical denote elements that are similar.

DETAILED DESCRIPTION

Figure 1:
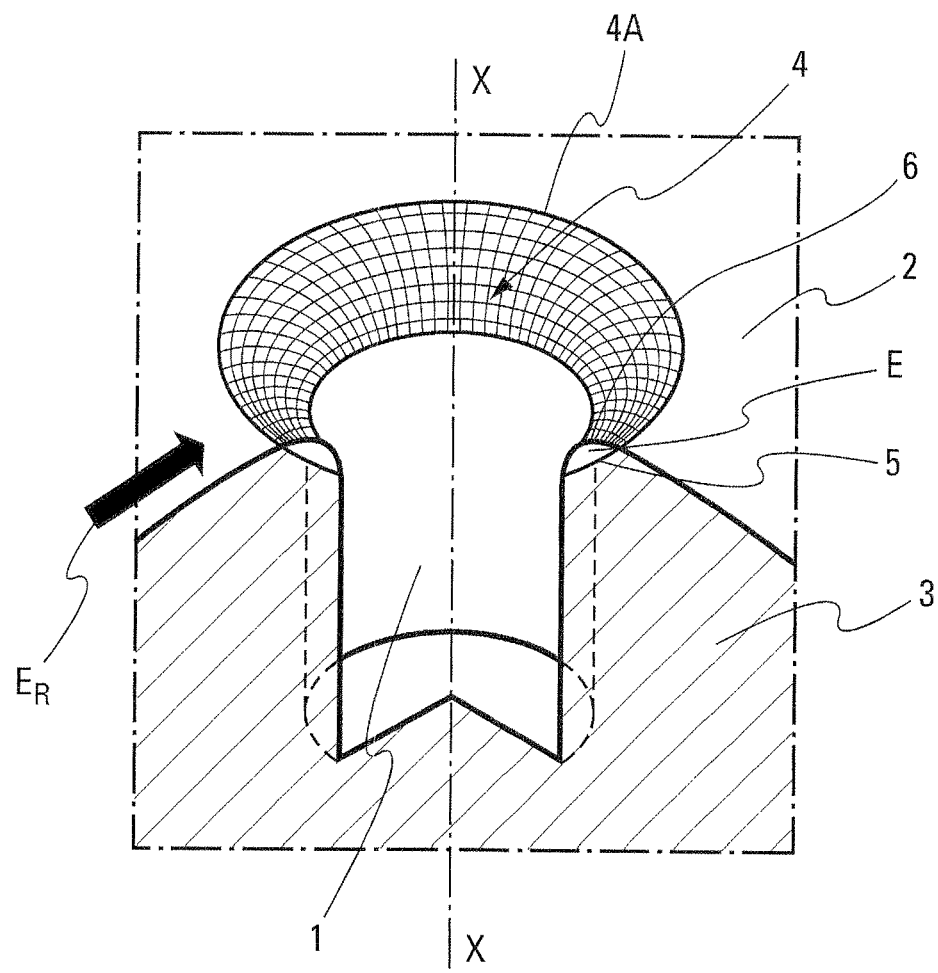
FIG. 1 schematically shows, with partial cutaway, a first embodiment of the present invention.

FIG. 1 depicts a blind cavity 1 created in the intrados 2 of an airplane wing 3 (not depicted). The blind cavity 1 is of cylindrical shape and of longitudinal axis X-X. It comprises a single circular orifice 4 which opens onto the surface of the intrados 2. This orifice 4 is positioned in a highly energetic air flow with a grazing angle of incidence (symbolized by the arrow $E_R$).

The edge 4A of the orifice 4 has a chamfer 5 to which a mesh structure 6 of annular shape is fixed (for example by bonding or welding). This mesh structure 6, which is slightly curved, completes, with a fit, the chamfered edge 4A of the orifice 4, so as to form an annular empty space E between itself and the chamfer 5.

Thus, as it passes through the meshes of the structure 6, the energetic grazing air flow $E_R$ is split into a multitude of less energetic secondary air flows (not depicted). The low intensity sound waves generated in the space E by the chamfered edge 4A under the effect of the secondary air flows are forced to pass through the mesh structure 6. As they do so, the (already low) intensity of the sound waves is reduced, thus appreciably decreasing the intensity of the noise generated by the orifice 4 outside of said space E.

Figure 2:
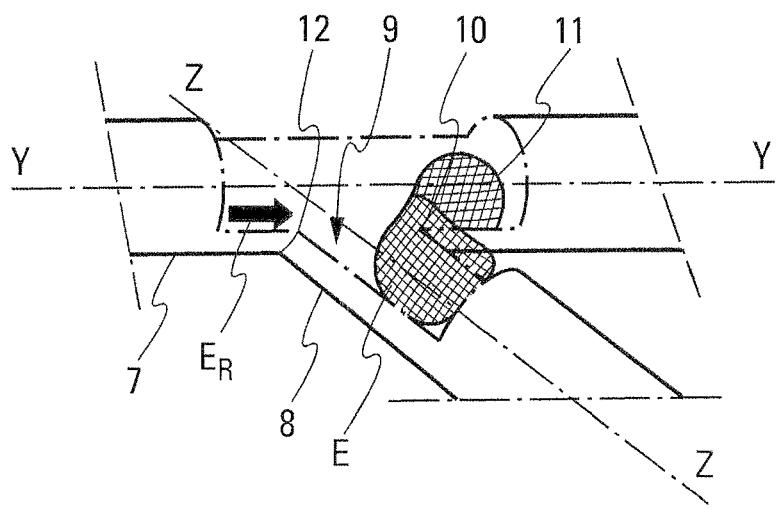
FIG. 2 schematically illustrates, with partial cutaway, a second embodiment of the present invention.

FIG. 2 depicts the main duct 7 of an aircraft air cooling system. This main duct 7 is a tube of longitudinal axis Y-Y, through which an energetic cooling air stream flows.

An auxiliary duct 8, likewise tubular but of axis Z-Z, is connected to the main duct 7 to form a Y-shaped branch. An orifice 9, made in the lateral face of said main duct 7, allows the auxiliary duct 8 to be connected thereto.

In this second example, the flow of the energetic air stream, symbolized by the arrow $E_R$, is at a grazing angle of incidence with respect to said orifice 9.

As FIG. 2 shows, the downstream part 10 of the edge of the orifice 9 is surrounded by a mesh structure 11 so as to form, between the latter and the downstream edge part 10, an empty space E.

Like in the first example illustrated in FIG. 1, having the energetic air flow $E_R$ pass through the mesh structure 11 yields less energetic secondary air flows. Under the action of the latter, the edge part 10 produces, in the space E, sound waves of low intensity which are then forced to pass through the mesh structure 11, something which decreases their intensity and therefore the noise produced by the orifice 9 outside of the space E.

Figure 3:
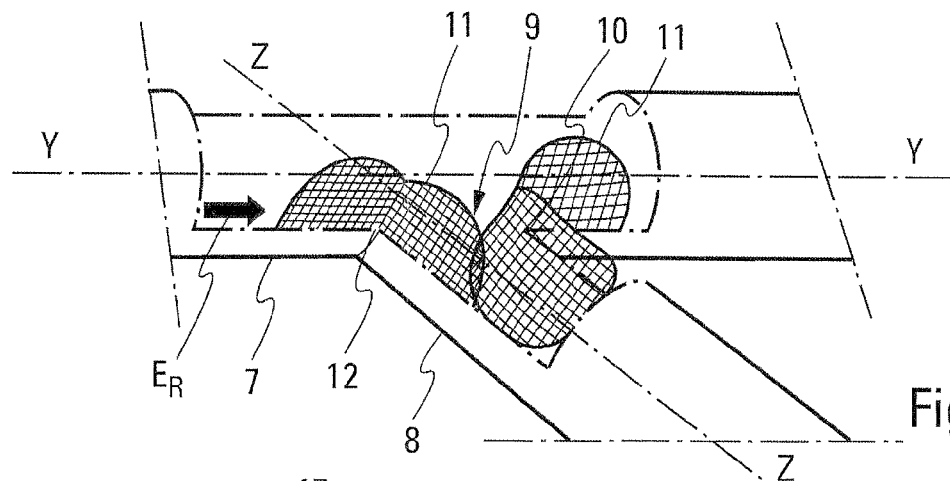
FIG. 3 is a figure similar to FIG. 2, depicting a variant of the second embodiment.

As FIG. 3 shows, the upstream part 12 of the edge of the orifice 9 may equally be surrounded by a mesh structure 11, for example identical to the one surrounding the downstream edge part 10.

Figure 4:
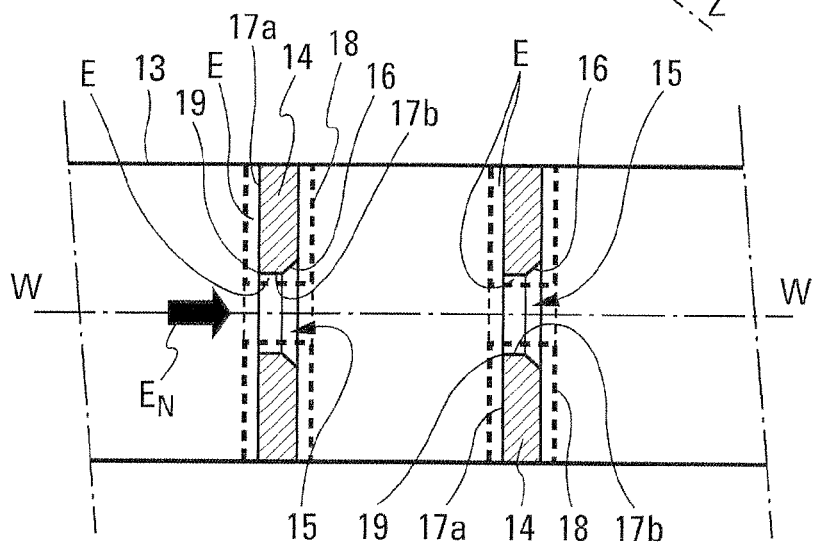
FIG. 4 shows, in schematic longitudinal section, a third embodiment of the present invention.

FIG. 4 depicts a cylindrical air duct 13 of longitudinal axis W-W, according to a third embodiment of the present invention.

Two rings 14, which are substantially parallel and centered about the axis W-W, are housed inside said duct 13. The orifices 15 of the rings 14 have passing through them an energetic air flow the angle of incidence of which is along a normal, symbolized by the arrow $E_N$. The downstream part 16 of the edge of the orifice 15 of each of the rings 14 is chamfered.

Figure 5:
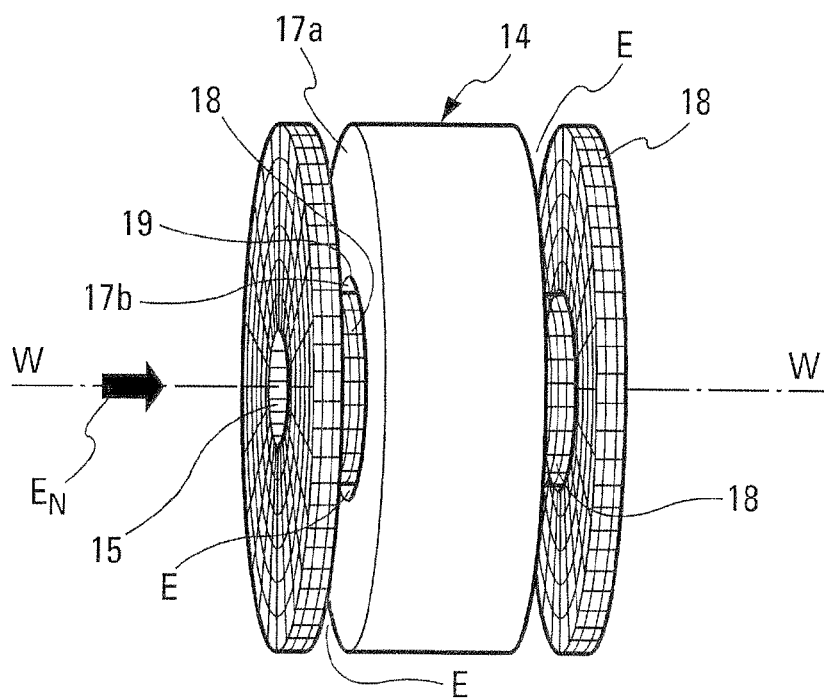
FIG. 5 is a partial schematic perspective depiction of the third embodiment of FIG. 4.

As FIGS. 4 and 5 show, a mesh structure 18 is positioned around the entire edge 19 of said orifices 15 such that an empty space E is created between this mesh structure and said edge 19.

Furthermore, the external surfaces 17a and 17b of the rings 14a are surrounded by the mesh structure 18 so that an empty space E is created between this mesh structure and said external surfaces 17a and 17b in order to extend the empty space E. This then avoids direct impingement of the energetic air flow $E_N$ on the solid surfaces of said rings 14.

Moreover, as shown by FIGS. 1 to 3 and 5, the square-shaped meshes of the mesh structure 6, 11, 18 are formed from filaments criss-crossing one another. Some of said filaments are orthogonal to the edge of the orifice 4, 9, 15 and others are parallel thereto.

What is more, the mesh structure 6, 11, 18 is preferably made of a metallic material (steel, aluminum, etc.) which allows the mesh structure to withstand the energetic flow $E_R$, $E_N$ and retain its initial shape. It may equally be made of a rigid or elastic plastic.

The invention claimed is:

1. A method for reducing the noise generated by an orifice placed in an energetic gas flow,
    wherein at least part of the edge of said orifice is loosely surrounded with a mesh structure so as to create a space between the latter and said edge part,
    said mesh structure
    dividing said energetic gas flow into a plurality of less energetic secondary gas flows passing through said space to reach said edge part, and
    breaking up the sound waves generated by said edge part under the action of said less energetic secondary gas flows.

2. The method as claimed in claim 1, wherein, when the angle of incidence of said flow is normal to said orifice, said mesh structure is positioned around the entire edge of said orifice.

3. The method as claimed in claim 1, wherein, when the angle of incidence of said flow is at a grazing angle to said orifice, said mesh structure is arranged at least around the downstream part of said orifice.

4. The method as claimed in claim 1, wherein: at least part of the edge of said orifice is chamfered; and said mesh structure is fixed to said chamfered part in such a way as to form said space between the latter and said mesh structure.

5. The method as claimed in claim 1, wherein, with the meshes of said mesh structure consisting of filaments criss-crossing one another, some of said filaments are orthogonal to at least part of the edge of said orifice and others are parallel thereto.

6. The method as claimed in claim 1, wherein said mesh structure is made of a metallic material.

7. A method comprising employing a mesh structure to reduce noise generated by an orifice in a first gas flow,
    wherein the mesh structure surrounds an edge part of the orifice,
    wherein a space exists between the mesh structure and the edge part,
    wherein the mesh structure divides the first gas flow into a plurality of secondary gas flows passing through the space toward the edge part,
    wherein each secondary gas flow is less energetic than the first gas flow,
    wherein the mesh structure decreases the intensity of sound waves generated by said edge part under the action of the secondary gas flows.

* * * * *